(12) United States Patent
Yan et al.

(10) Patent No.: US 10,860,497 B2
(45) Date of Patent: Dec. 8, 2020

(54) METHOD, APPARATUS, AND SYSTEM FOR CACHING DATA

(71) Applicant: EMC IP Holding Company LLC, Hopkinton, MA (US)

(72) Inventors: Bob Yan, Chengdu (CN); Bernie Hu, Chengdu (CN); Vincent Wu, Chengdu (CN); Jia Huang, Chengdu (CN); Amber Li, Chengdu (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 15/712,418

(22) Filed: Sep. 22, 2017

(65) Prior Publication Data

US 2018/0089107 A1    Mar. 29, 2018

(30) Foreign Application Priority Data

Sep. 23, 2016   (CN) ............................ 2016 1 0848587

(51) Int. Cl.
*G06F 12/123*    (2016.01)
*G06F 12/0862*   (2016.01)
(Continued)

(52) U.S. Cl.
CPC ............ *G06F 12/123* (2013.01); *G06F 3/064* (2013.01); *G06F 12/0246* (2013.01);
(Continued)

(58) Field of Classification Search
None
See application file for complete search history.

(56) References Cited

U.S. PATENT DOCUMENTS

2007/0011421 A1* 1/2007 Keller, Jr. ............. G06F 1/3225
                                                           711/165
2014/0379992 A1* 12/2014 Dey .................... G06F 12/0808
                                                           711/135
(Continued)

FOREIGN PATENT DOCUMENTS

CN          103514106 A       1/2014
CN          104516471 A       4/2015
(Continued)

OTHER PUBLICATIONS

First Chinese Office Action issued in related Chinese Application Serial No. 2016108485870 dated Jun. 1, 2020, 7 pages.

*Primary Examiner* — Charles Rones
*Assistant Examiner* — Jonah C Krieger
(74) *Attorney, Agent, or Firm* — Brian J. Colandreo; Mark H. Whittenberger; Holland & Knight LLP

(57) ABSTRACT

The present disclosure provided a method, apparatus, and system for caching data. In an embodiment of the present disclosure, the method for caching data comprises: recording, within a recording period for recording access count information of the data, access count information on respective data, wherein the recording period includes a plurality of recording timeslots, wherein the recording of the access count information within a single recording timeslot is restricted, while the access count information within the plurality of recording timeslots is aggregated; and promoting, in response to expiration of the recording period, the respective data into a cache area based on the access count information.

20 Claims, 12 Drawing Sheets

(51) Int. Cl.
  *G06F 12/0868* (2016.01)
  *G06F 3/06* (2006.01)
  *G06F 12/02* (2006.01)
  *G06F 12/0866* (2016.01)
  *G06F 12/127* (2016.01)
  *G06F 12/0897* (2016.01)

(52) U.S. Cl.
  CPC ...... *G06F 12/0862* (2013.01); *G06F 12/0866* (2013.01); *G06F 12/0868* (2013.01); *G06F 12/127* (2013.01); *G06F 12/0897* (2013.01); *G06F 2212/1016* (2013.01); *G06F 2212/1044* (2013.01); *G06F 2212/461* (2013.01); *G06F 2212/466* (2013.01); *G06F 2212/6024* (2013.01)

(56) References Cited

U.S. PATENT DOCUMENTS

| | | | | |
|---|---|---|---|---|
| 2015/0088805 | A1* | 3/2015 | Kakarla | G06F 16/24552 707/600 |
| 2015/0220280 | A1* | 8/2015 | Ishizaki | G06F 3/0619 711/114 |
| 2016/0005423 | A1* | 1/2016 | Neppalli | G11B 5/09 360/25 |
| 2017/0353459 | A1* | 12/2017 | Lawrence | H04L 63/10 |
| 2018/0081541 | A1* | 3/2018 | Uppal | G06F 3/061 |

FOREIGN PATENT DOCUMENTS

| | | |
|---|---|---|
| CN | 104969170 A | 10/2015 |
| CN | 105280197 A | 1/2016 |
| CN | 105335102 A | 2/2016 |

\* cited by examiner

METHOD, APPARATUS, AND SYSTEM FOR CACHING DATA

RELATED APPLICATIONS

This application claim priority from Chinese Patent Application Number CN201610848587.0, filed on Sep. 23, 2016 at the State Intellectual Property Office, China, titled "METHOD, DEVICE AND SYSTEM FOR BUFFERING DATA" the contents of which is herein incorporated by reference in its entirety.

FIELD

Embodiments of the present disclosure generally relate to the technical field of caching, and more specifically, to a method, apparatus and system for caching data.

BACKGROUND

Hierarchical storage is a technology proposed based on "information life cycle management" to deposit data information in a multi-layered manner. According to this technology, a storage structure generally comprises a bottom-layer storage pool, a middle-layer cache (for example, FAST Cache by EMC), and a top-layer system cache (for example, physical DRAM (Dynamic Random Access Memory), such as SP Cache by EMC). A Layer 2 cache such as the FAST cache, which is the middle-layer cache between the top-layer system cache and the bottom-layer storage pool, is proposed to solve an issue with cache scalability, so as to allow for a better effective input/output (I/O) response time and I/O processing rate in the storage system.

In the Layer 2 cache such as FAST Cache, a promotion logic is adopted, which uses a reference tracking technique to establish a long-term access history of data through a Shadow Cache mechanism. This mechanism will establish a tracking structure that can maintain an access count for each element; the number of access counts stored in the tracking structure is usually a certain multiple (currently set as 1, as an example) of the size of an element list in the FAST Cache. When the reference count of an element reaches a promotion threshold (set to 3, as an example), the corresponding page is marked so as to be promoted into the FAST Cache; and when the page is moved into the FAST Cache, the element is transferred to the FAST Cache and removed from the Shadow Cache.

The Shadow Cache usually includes two parts, i.e., an HFS2 (High-Frequency Small-block Sequential Filter) list and a Shadow Cache list, wherein the HFS2 list is much smaller than the Shadow Cache list. When there is a new reference, the new reference will be added to the HFS2 list, while in order to free up storage space, the earliest reference will be transferred to the Shadow Cache list. When the reference is on the HFS2 list, re-hit to the cache page represented by the element will not cause increment of the Shadow Cache reference count, which, instead, is reset to 1. Besides, the re-hit will cause the element (reference) as the latest element to be moved to a head of the HFS2 list again. This will cause an issue that a long-term hot data cannot be promoted to the FAST Cache, while the short-term hot noise data will be promoted to the FAST Cache.

SUMMARY

In view of the above, the present disclosure provides a novel solution for caching data, so as to overcome or alleviate at least part of the defects existing in the prior art indicated above.

According to a first aspect of the present disclosure, there is provided a method for caching data. The method may comprise: recording, within a recording period for recording access count information of data, access count information on respective data, wherein the recording period includes a plurality of recording timeslots, the recordings of the access count information within a single recording timeslot is restricted, while the access count information within the plurality of recording timeslots is aggregated; and promoting, in response to expiration of the recording period, the respective data into a cache area based on the access count information.

In an embodiment according to the present disclosure, the recording access count information on respective data may comprise: recording, within a single recording timeslot of the recording period, multiple accesses for the same data as one access.

In another embodiment according to the present disclosure, the method may further comprise: adjusting at least one of lengths of recording timeslot and the recording period based on at least one of input/output I/O load condition, caching condition, and promotion frequency.

In a further embodiment according to the present disclosure, the access count information may be stored in a hot zone list, the hot zone list including a first recording zone and a second recording zone. The time when the data associated with the access count information in the first recording zone was accessed is later than the time when the data associated with the access count information in the second recording zone was accessed, wherein the promoting into the caching zone is performed for the data associated with the access count information recorded in the first recording zone.

In a still further embodiment according to the present disclosure, the method may also comprise: when the access count information stored in the first recording zone exceeds a predetermined amount, transferring the access count information of the data with a relatively early accessed time to the second recording zone.

In another embodiment according to the present disclosure. The method may also comprise: when the access count information stored in the second recording zone exceeds a predetermined amount, removing the access count information of the data with a relatively early accessed time from the second recording zone.

In a further embodiment according to the present disclosure, the method may also comprise: when data with access count information recorded in the second recording zone is accessed, transferring the access count information on the data from the second recording zone to the first recording zone.

In a still further embodiment according to the present disclosure, the access count information on the data which are transferred into the first recording zone may be maintained unchanged.

In a yet further embodiment of the present disclosure, the method may also comprise: adjusting sizes of the first recording zone and the second recording zone based on the I/O load condition and the caching condition.

According to a second aspect of the present disclosure, there is provided an apparatus for caching data. The apparatus may comprise an access counting module and a data promotion module. The access counting module may be configured to record, within a recording period for recording access count information of the data, access count information on respective data, wherein the recording period includes a plurality of recording timeslots, the recording of the access count information within a single recording timeslot is restricted, while the access count information within the plurality of recording timeslots being aggregated. The data promotion module may be configured to: promote, in response to expiration of the recording period, the respective data into a cache area based on the access count information.

According to a third aspect of the present disclosure, there is provided a system for caching data. The system comprises: an access adapter, a timeslot generator, a hot zone manager, and a promotion scanner. The access adapter may be configured to provide an interface for data access to the outside. The timeslot generator may be configured to generate, within a recording period for recording access count information of data, a recording timeslot, and provide a corresponding recording timeslot identifier, wherein the recording period includes a plurality of recording timeslots. The hot zone manager is configured to manage a hot zone list for storing access record information of data and to record access record information on respective data and corresponding recording timeslots based on data access via the access adapter using the recording timeslot identifier produced by the timeslot generator based on data access via the access adapter, wherein the recording of the access count information within a single recording timeslot is restricted, while access count information within a plurality of recording timeslots will be aggregated. The promotion scanner is configured to scan the hot zone list, and promote, in response to expiration of the recording period, the respective data into the cache area based on the access count information.

According to fourth aspect of the present disclosure, there is provided a computer program product with program codes embodied thereon, the program codes, when being executed on a processor, causing the processor to perform the method according to the first aspect of the present disclosure.

In an embodiment of the present disclosure, there is provided an improved solution for caching data. According to the solution, access count information on respective data is recorded within respective recording timeslots; however, in a single recording timeslot, the recording of the access count information do not always constantly increase with increase of the times that the data are accessed; instead, the recording is restricted; meanwhile, the access count information within different recording timeslots will be aggregated; after expiration of the recording period, based on the access count information aggregated within the recording period, data promoted into the cache area will be determined. Therefore, with the embodiments of the present disclosure, a hotter data within a relatively long term can get a better opportunity to be promoted into the cache area, and meanwhile the possibility of promoting noise data that is relatively hot within a short term can be significantly reduced, thereby achieving a more effective data caching and a more sufficient cache resource utilization.

BRIEF DESCRIPTION OF THE DRAWINGS

Features, advantages, and other aspects of various embodiments of the present disclosure will become more apparent by reference to the following detailed description in conjunction with the accompanying drawings.

DETAILED DESCRIPTION OF EMBODIMENTS

Hereinafter, various exemplary embodiments of the present disclosure will be described in detail with reference to the accompanying drawings. It should be noticed that these drawings and depictions merely involve exemplary preferred embodiments. It should be noted that alternative embodiments of the structure and method disclosed here are easily envisaged according to subsequent depictions, and these alternative embodiments may be used without departing from the principle of the disclosure sought for protection by the present disclosure.

It should be understood that these exemplary embodiments are given only to enable those skilled in the art to better understand and then further implement the present disclosure, not to limit the scope of the present disclosure in any manner. Besides, in the accompanying drawings, optional steps, modules, units and the like are shown in dashed boxes only for illustrative purposes.

As used herein, the terms "comprise(s)," "include(s)" and other similar terms are to be read as open-ended terms that mean "include, but is not limited to." The term "based on" is to be read as "based at least in part on." The term "one example embodiment" and "an example embodiment" are to be read as "at least one example embodiment." Relevant definitions of other terms will be given in the depictions infra.

Figure 1:
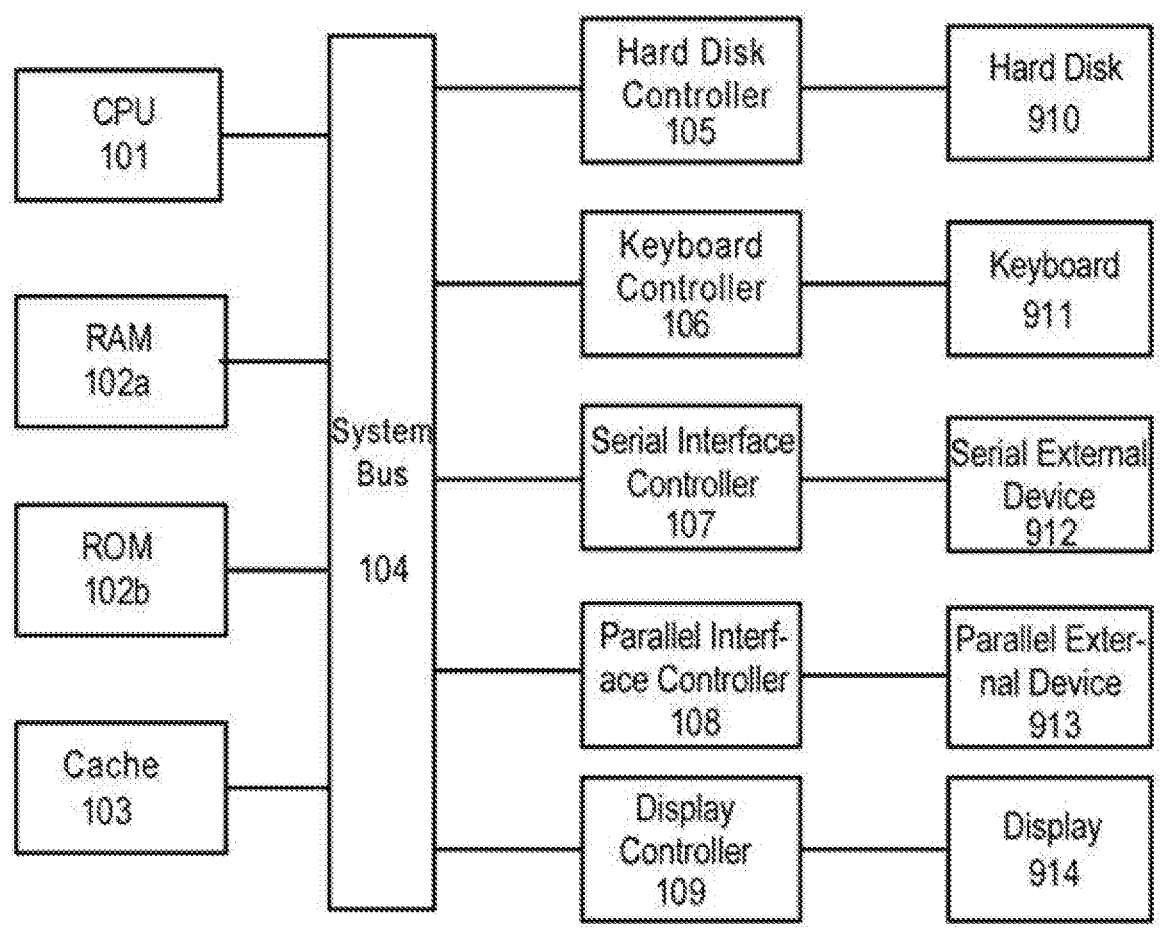
FIG. 1 schematically illustrates a structural block diagram of a computer device in which the embodiments of the present disclosure will be implemented therein.

Prior to describing the solution of caching data according to the present disclosure, reference will be first made to FIG. 1 to describe a computer device in which the embodiments of the present disclosure may be implemented. FIG. 1 schematically illustrates a structural block diagram of a computer device in which the embodiments of the present disclosure will be implemented therein.

The computer system shown in FIG. 1 comprises a CPU (central processing unit) 101, a RAM (random access memory) 102a, a ROM (read-only memory) 102b, a cache 103, a system bus 104, a hard-disk controller 105, a keyboard controller 106, a serial interface controller 107, a parallel interface controller 108, a display controller 109, a hard disk 110, a keyboard 111, a serial peripheral device 112, a parallel peripheral device 113, and a display 114. Among these components, the CPU 101, RAM 102a, ROM 102b, cache 103, hard-disk controller 105, keyboard controller 106, serial interface controller 107, parallel interface controller 108, and display controller 109 are connected to the system bus 104. The hard disk 110 is connected to the hard disk controller 105. The keyboard 11l is connected to the keyboard controller 106. The serial external device 112 is connected to the serial interface controller 107. The parallel external device 113 is connected to the parallel interface controller 108. And the display 114 is connected to the display controller 109.

It should be noted that the structural block diagram of FIG. 1 is illustrated only for exemplary purposes, not for limiting the present disclosure. In some cases, some devices may be added or reduced thereto or therefrom as needed. In addition, the embodiments of the present disclosure are directed to a solution for caching data in the cache 103, as an example. The solution may be stored as computer program codes in a storage device such as the hard disk 110 of the computer. The computer program codes, when being loaded into for example a memory to be executed, will cause the CPU 101 to execute the solution for caching data according to the present disclosure.

As indicated above, when depositing, data, the hierarchical storage may be adopted, and in the Layer 2 cache, promotion logic is adopted, which uses a reference tracking technique to establish/cache a long-term access history about data through a shadow cache mechanism. This mechanism will establish a tracking structure that can maintain an access count for each element. When the count of an element reaches a promotion threshold (set to 3, as an example), the corresponding page will be marked so as to be promoted into the FAST Cache; while the element is transferred to the FAST Cache, it is removed from a Shadow storage.

However, according to the mechanism in the prior art, when a data block on an HFS2 list is re-hit, it will be moved to a header of the list and its reference count will be reset to 1. Repetitive hit of such hot blocks will deprive of their opportunity to be moved to the Shadow cache list and finally deprive of their opportunity to be promoted to the Fast Cache. However, these hot data blocks are hottest data blocks having a high-frequency I/O hit, and a potential risk exists if they are excluded from promotion. Moreover, some data blocks may be relatively hot in a short term, but have a relatively low frequency of being hit in a long term, which are not hot data blocks. However, the time length for such data blocks being hot is just enough for them to escape from being reset in the HFS2 list, for example, each hit just happens when the data block is just moved into the Shadow cache list. Such data blocks actually belong to noise blocks. However, according to prior art mechanisms, these data blocks will also be promoted into the FAST Cache. In addition, in the prior art mechanism, promotion is usually made according to a fixed frequency. This promotion approach is rather inflexible and cannot be adapted to changes of system status.

In this regard, in the present disclosure, there is provided a solution for caching data so as to at least partially overcome the problems in the prior art. According to one embodiment of the present disclosure, access count information on respective data is recorded within a recording period for recording access count information of the data, wherein the recording period includes a plurality of recording timeslots, the recordings of the access count information within a single recording timeslot is restricted, while access count information within a plurality of recording timeslots is aggregated; in response to expiration of the recording period, the respective data are promoted to the cache storage based on the access count information. Therefore, in respective recording timeslots, access count information on respective data is recorded; while in a single recording timeslot, records for the access count information do not always increase with increase of the times of the data being accessed; instead, the recording is restricted; meanwhile, the access count information within different recording timeslots will be aggregated. However, after expiration of the recording period, data to be promoted into the cache storage will be determined based on the access count information aggregated within the recording period. Therefore, with the embodiments of the present disclosure, data that are hotter in a relatively long term can get a preferred opportunity to be promoted to the cache area, while the possibility of promoting the noise data which are hotter in a short term can be greatly reduced, thereby achieving a more effective data caching and a more sufficient cache resource utilization.

Hereinafter, the solution for caching data according to an embodiment of the present disclosure will be described in detail with reference to the accompanying drawings.

Figure 2:
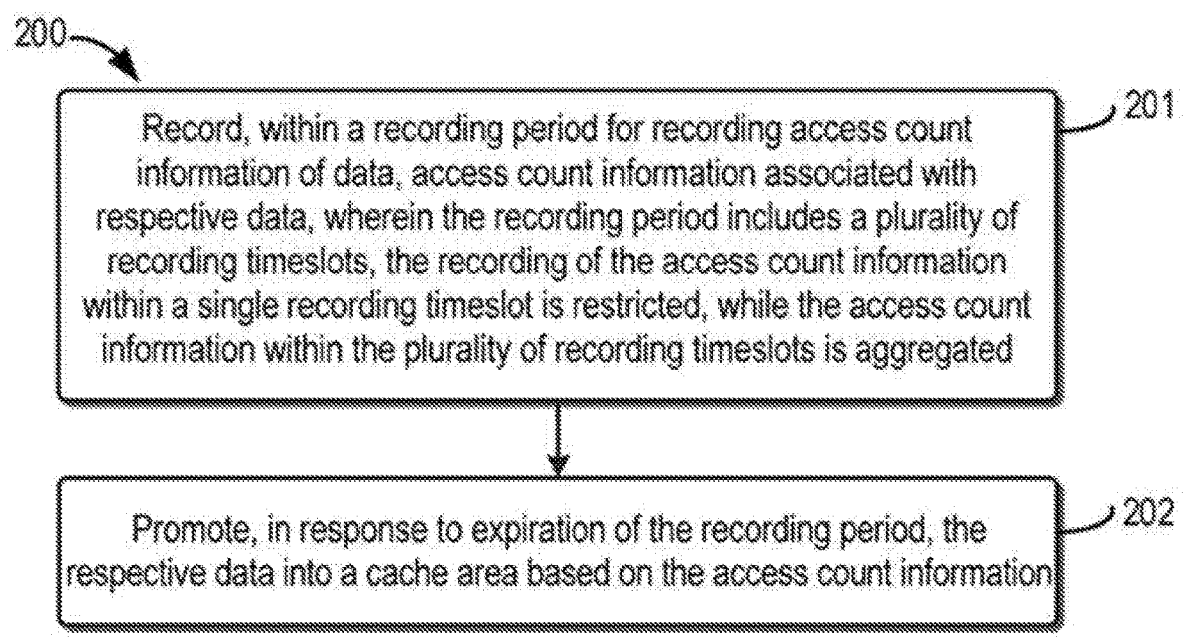
FIG. 2 schematically illustrates a flow diagram of a method for caching data according to an embodiment of the present disclosure.

First, reference is made to FIG. 2 which schematically illustrates a flow diagram of a method for caching data according to an embodiment of the present disclosure is presented.

As illustrated in FIG. 2, first, in step 201, access count information on respective data is recorded within a recording period for recording access count information of data. The recording period includes a plurality of recording timeslots, wherein the recording of the access count information within a single recording timeslot is restricted, while access count information within a plurality of recording timeslots is aggregated. In other words, in data caching according to the embodiments of the present disclosure, concepts of recording period and recording timeslot are introduced. The recording period may also be referred to a promotion period. When one recording period ends, a data promotion process will be executed and a next new recording period will begin. A recording period may include a plurality of recording timeslots. In the embodiments of the present disclosure, the recording timeslot is a minimum recording time unit for recording the access count information. Within a single recording timeslot, access count information is recorded for respective data; however, records of the access count information do not always increase with increase of the times of the data being accessed, instead, they are subject to certain restrictions. For example, in an embodiment of the present disclosure, multiple times of data access are only recorded as one access. Meanwhile, the access count information within different recording timeslots will be aggregated.

However, it should be noted that the restriction degree for the recording times within one recording timeslot is associated with promotion opportunities for long-term hot data and short-term hot data. In other words, the restriction degree will influence the promotion opportunities of the long-term hot data and the short-term hot noise data to the cache storage. The greater the restriction degree is, the larger the promotion opportunity given to the hot data is, while the larger restriction on the promotion opportunity set for the hot noise data is; otherwise, the smaller the restriction degree is, the smaller the promotion opportunity given to the hot data is, while the smaller the restriction on the promotion opportunity set for the hot noise data is. Therefore, in practical applications, an appropriate restriction may be applied according to actual situations. In the previous example, it is only exemplary to record multiple times of data access as one access, which may also be recorded as other appropriate times, for example, twice, etc.

Additionally, at least one of lengths of the recording timeslot and the recording period may be adjusted based on at least one of an input/output (I/O) load condition, caching condition, and promotion frequency. It may be understood that not only the promotion frequency but also the restriction on the access count may be adjusted by adjusting the recording period and the recording timeslot. Through such adjustment, a flexible promotion manner and promotion opportunity restriction may be provided so as to be adapted to changes of system status.

In an embodiment according to the present disclosure, the length of the recording period may be adjusted by only changing the number of the recording timeslots while maintaining the recording period unchanged; or, the length of the recording period may be adjusted by changing the number of recording timeslots while maintaining the length of the recording timeslots unchanged; or, the length of the recording period may be adjusted only by changing the length of the recording timeslot; or, the length of the recording period may be changed by changing both the length and the number of the recording timeslots. In another embodiment of the present disclosure, it is also allowed to only change the length or number of the recording timeslots without changing the recording period, so as to only adjust restrictions on the promotion opportunities of the long-term hot data and the short-term noise data.

Figure 3:
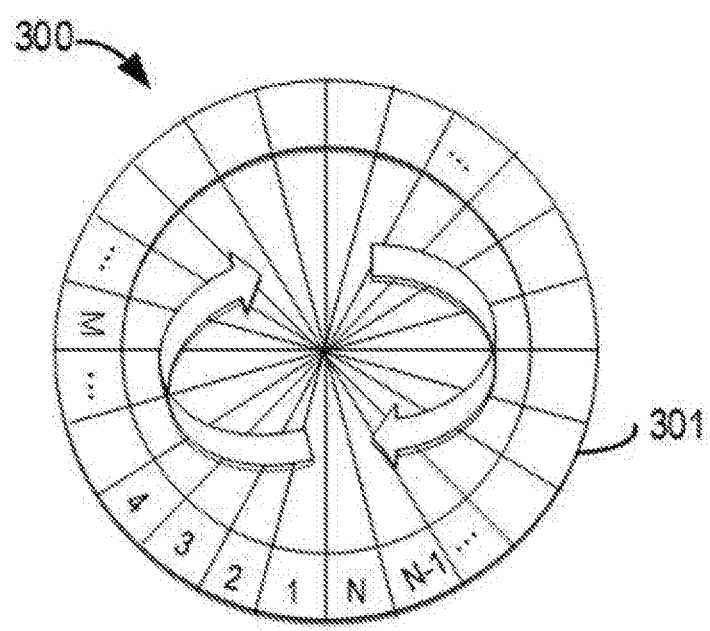
FIG. 3 schematically illustrates a diagram of an instance of a recording period according to an embodiment of the present disclosure.
Figure 4:
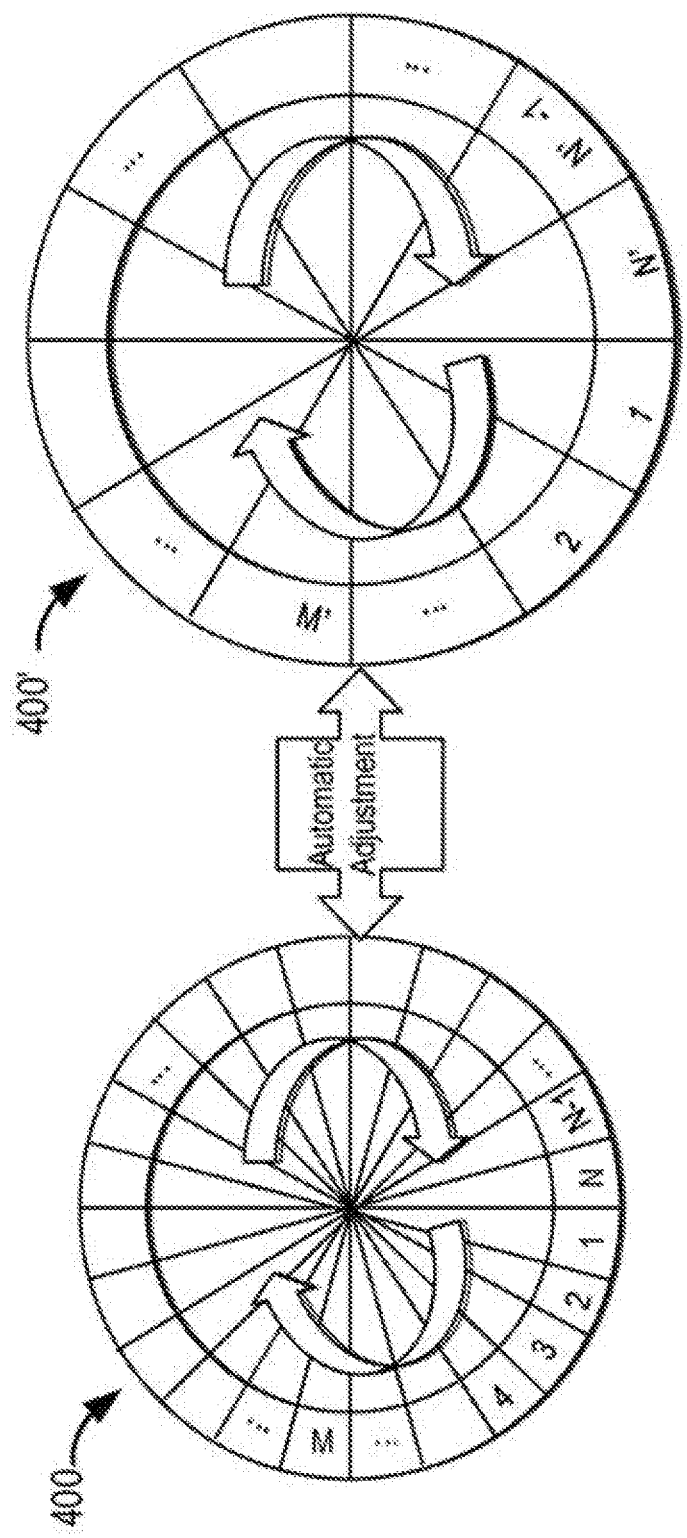
FIG. 4 schematically illustrates a schematic diagram of automatically adjusting a recording timeslot and a recording period according to an embodiment of the present disclosure.

For illustrative purposes, the recording period and recording timeslots as well as their adjustment will be described exemplarily with reference to FIG. 3 and FIG. 4, wherein FIG. 3 schematically illustrates a time circle 300 used in an embodiment of the present disclosure, and FIG. 4 illustrates a diagram of adjusting a time circle 400 according to an embodiment of the present disclosure.

As illustrated in FIG. 3, in the embodiment, the recording period adopts a form of time circle 300. The time circle 300 is divided up into N time slices, i.e., time slice 1, time slice 2, time slice 3, time slice 4 . . . time slice M, . . . , time slice N−1 and time slice N. Each time slice corresponds to a timeslot. In other words, a plurality of recording timeslots constitute the time circle 300. The length of the time circle may be fixed; optionally, it may also be a customizable system parameter, for example, may be user-customized. In other words, it is adjustable. In a same recording timeslot, I/O hit of the same data blocks will not increase the access counts, i.e., the access count within a single recording timeslot is restricted to 1. However, within different recording timeslots, I/O hit of the same data blocks will cause aggregation of the access counts.

As mentioned above, at least one of the recording period and the recording timeslot may be adjusted for example based on an I/O load condition. For example, when the I/O load is relatively small, the recording period and/or recording timeslot may be shortened; while when the I/O load is relatively heavy, the recording period and/or recording timeslot may be prolonged. For example, as shown in FIG. 4, the current time circle 400 may be automatically adjusted to the time circle 400'. Specifically, as shown in FIG. 4, the adjustment is performed by changing the number of recording timeslots from M to M' and increasing the length of the recording timeslot.

However, it should be noted that FIG. 4 is only provided for illustrative purposes, and the present invention is not limited thereto. For example, depending on requirements, the length of the time circle 400 may be increased by increasing the number of recording timeslots, the length of the time circle 400 may be decreased by decreasing the number of recording timeslots, and it is also possible to adjust only the length or the number of the recording timeslots while maintaining the recording timeslots unchanged. In an embodiment according to the present disclosure, the length of the time circle 400 may be adjusted by decreasing or increasing the number of recording timeslots while maintaining the length of the recording timeslots unchanged, dependent on requirements. In another embodiment of the present disclosure, the length of the time circle 400 may be changed only by changing the length of the recording timeslot. In a further embodiment of the present disclosure, the length of the time circle 400 may be changed by changing the length and the number of the recording timeslots.

In addition, adjustment of at least one of the recording period and the recording timeslot may also be performed according to a cache condition or promotion frequency. For example, if the current utilization of the cache or the promotion frequency is relatively high, it may be considered to prolong the recording period and/or recording timeslot; while if the current utilization of the cache or the promotion frequency is relatively low, the recording period and/or recording timeslot may be shortened. In addition, it may also be considered to adjust at least one of the recording period and the recording timeslot based on any combination of the I/O load condition, caching condition or promotion frequency.

Hereinafter, an exemplary method of performing the adjustment is provided for illustrative purposes. In the exemplary method, $D_c$ indicates a size of the original recording period; $D_{nc}$ indicates a size of the adjusted recording period; $T_c$ indicates the number of the original recording timeslots; $T_{nc}$ indicates of the number of adjusted recording timeslots; $\alpha$ and $\beta$ indicate adjustment factors for the recording period and recording timeslots, which, for example, is a value between 0 and 1.

i) In the case of a relatively heavy I/O load, it is desirable to decrease the utilization of cache and the promotion frequency. Therefore, the recording period may be extended, and the number of recording timeslots may be reduced, so as to increase the length of the recording timeslot. At this point, adjustment may be made according to equation 1 below.

$$D_{nc}=(1+\alpha)D_c, T_{nc}=(1-\beta)T_c \quad (1)$$

ii) In the case of a relatively light I/O load, it is desirable to increase the cache utilization and the promotion frequency. Therefore, the recording period may be shrunk, and the number of recording timeslots may be increased, so as to shorten the length of the recording timeslots. At this point, adjustment may be made according to equation 2 below.

$$D_{nc}=(1-\alpha)D_c, T_{nc}=(1+\beta)T_c \quad (2)$$

However, it shall be noted that the equations above are only provided for illustrative purposes, and the present invention is not limited thereto; instead, the adjustment may be performed according to any other appropriate manner.

Figure 5:
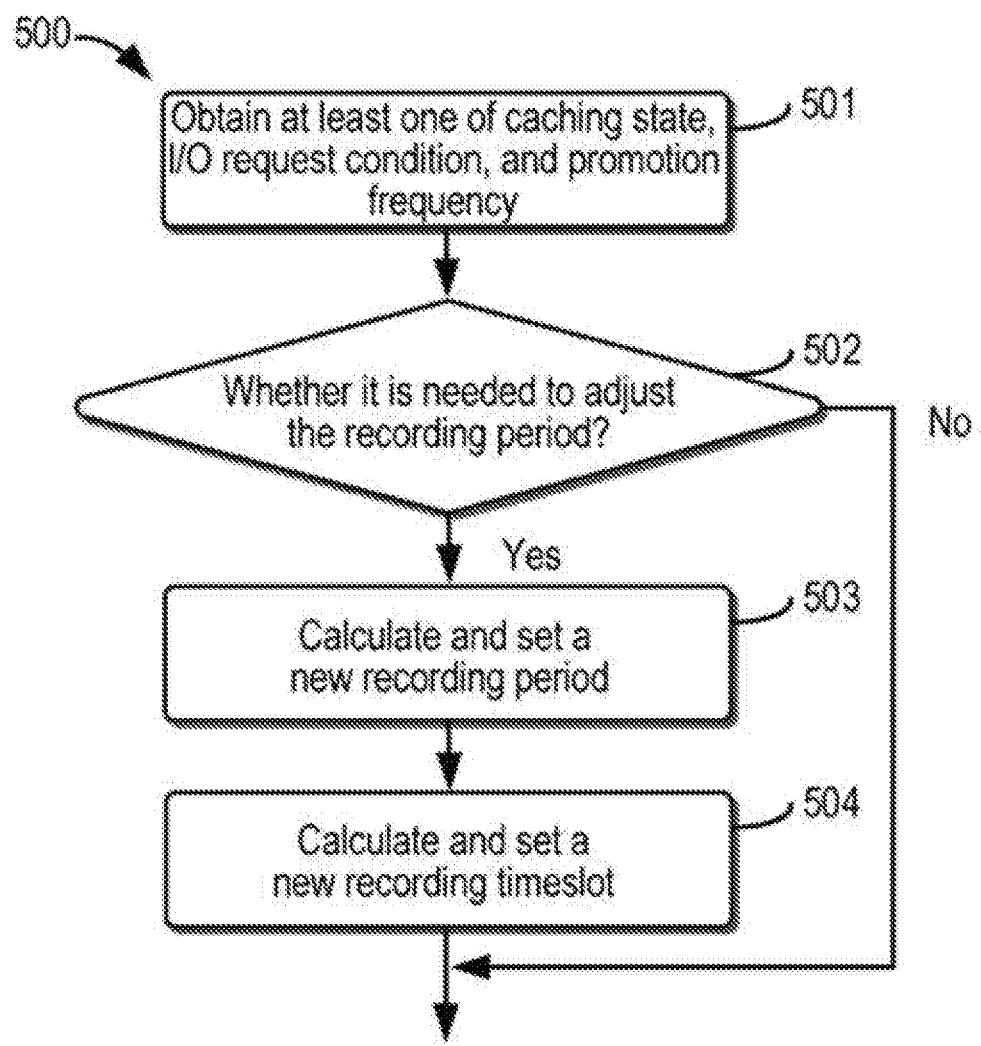
FIG. 5 schematically illustrates a flow diagram of a method of adjusting a recording timeslot and a recording period according to an embodiment, of the present disclosure.

Further, for illustrative purposes, FIG. 5 schematically illustrates a flow diagram of a method of adjusting a recording timeslot and a recording period according to an embodiment of the present disclosure. As shown in the figure, first, at least one of a cache state, an I/O request condition, and a promotion frequency is acquired in step 501. Then, in step 502, whether the recording period needs to be adjusted is determined based on at least one of the cache state, the I/O request condition, and the promotion frequency. For example, it may be determined whether change of the system state is within a predetermined threshold; if yes, adjustment is not needed; if not, adjustment is needed. If it is determined in step 502 that adjustment is not needed, this process ends; if it is needed to perform adjustment, a new recording period is calculated and set in step 503, and a new number of timeslots is calculated and set in step 504. It shall be noted that step 503 and step 504 may be performed in a sequence shown in FIG. 5 or may be performed in parallel; it is also possible to first calculate and set a new number of timeslots, and then calculate and set a new recording period.

In addition, as indicated above, the recording of the access count information within a single recording timeslot is restricted, in other words, within a single recording timeslot, records information of a data does not always increase with increase of the access times, but is restricted. For illustrative purposes, an exemplary method for recording the access counts will be illustrated in detail with reference to FIG. 6, wherein the data access counts within the single recording timeslot is limited to 1 at most.

Figure 6:
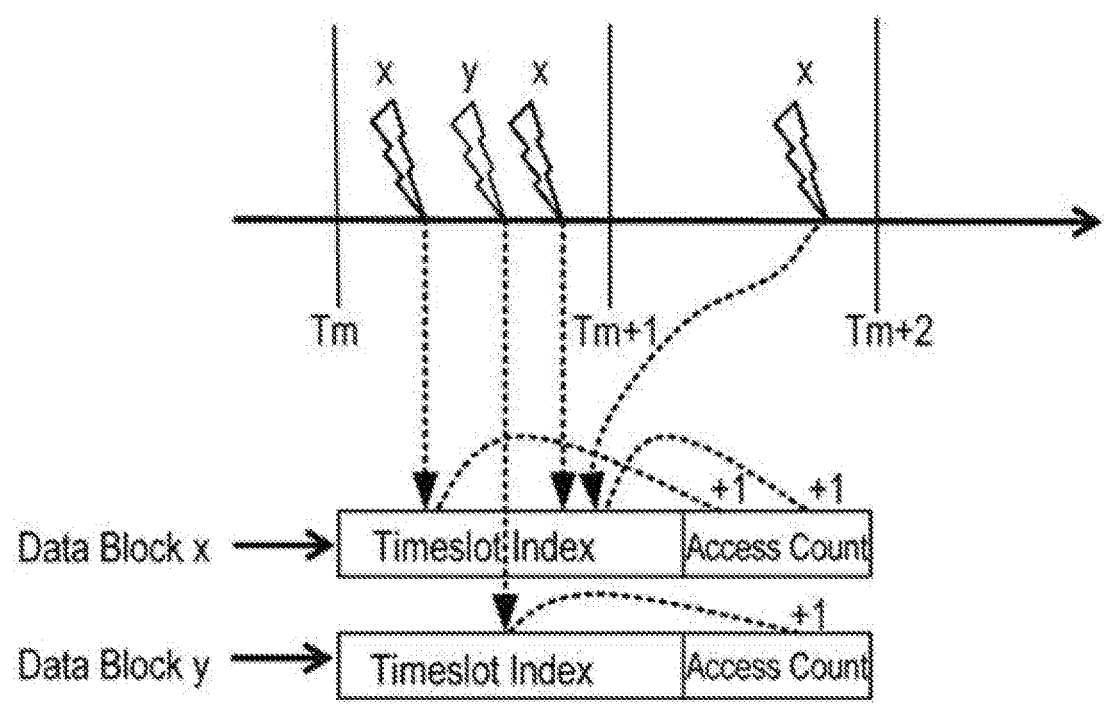
FIG. 6 schematically illustrates a schematic diagram of a manner for performing access counting within a recording timeslot according to an embodiment of the present disclosure.

Specifically, in FIG. 6, within two recording timeslots indexed by Tm and Tm+1, the data block x is accessed thrice in total, and the data block y is accessed once. The data x is accessed twice within the timeslot indexed by Tm; however because the two accesses occur within the same recording timeslot, only the first access is recorded (+1), while the second access is not recorded. Within the recording timeslot indexed by Tm+1, the data x is accessed again. Because this access and the previous two accesses occur in different recording timeslots, this access is recorded (i.e., the access count +1). The data y is accessed once within the recording timeslot indexed by Tm, such that its access count is added by 1, while in the recording timeslot indexed by Tm+1, it is not accessed; therefore, its access count maintains unchanged within the recording timeslot. However, as previously mentioned, it shall be noted that it is only exemplary to only record multiple data accesses as once, and dependent on actual situations, they may also be recorded as other appropriate times, for example, twice, etc.

Next, reference is made back to FIG. 2 to continue describing the method for caching, data according to one embodiment of the present disclosure. As shown in FIG. 2, in step 202, in response to expiration of the recording period, respective data are promoted into the cache area based on the access count information. After expiration of the recording period, access count information of respective data may be acquired, and then it may be determined whether to promote the respective data, based on the access count information. For example, if the access count information is greater than or equal to 3, the data may be promoted into the cache area; while the data with access count information less than 3 will not be promoted, its access count information will be continued to be recorded instead, and the data per se are still stored in a storage with a lower rate.

According to an embodiment of the present disclosure, the access count information may be stored in a hot zone list. The hot zone list is a storage area for recording the access count information of data, which, for example, may comprise a first recording zone and a second recording zone. The time when the data associated with the access count information stored in the first recording zone are accessed is later than the time when the data associated with the access count information stored in the second recording zone are accessed. In other words, the first recording zone stores the access count information of the data that is accessed recently, while what is stored in the second recording zone is the access count information of the data that is accessed relatively earlier. Furthermore, in step 202, it is allowed only to promote the data associated with the access count information recorded in the first recording zone.

According to an embodiment of the present disclosure, when the access count information stored in the first recording zone exceeds a predetermined amount, the access count information of the data that were accessed earlier may be transferred to the second recording zone. According to an embodiment of the present disclosure, when the access count information stored in the second recording zone exceeds a predetermined amount, the access count information of the data that were accessed earlier may be removed from the second recording zone. In addition, when the data whose access count information is recorded in the second recording zone is accessed, the access count information on the data may be transferred to the first recording zone from the second recording zone. Moreover, the access count information on the data as transferred to the first recording zone may be further maintained unchanged. In this way, while considering increasing the promotion opportunity of the long-term hot data, the influence of the characteristics regarding the time when the data were accessed on the promotion opportunity may also be considered.

Figure 7:
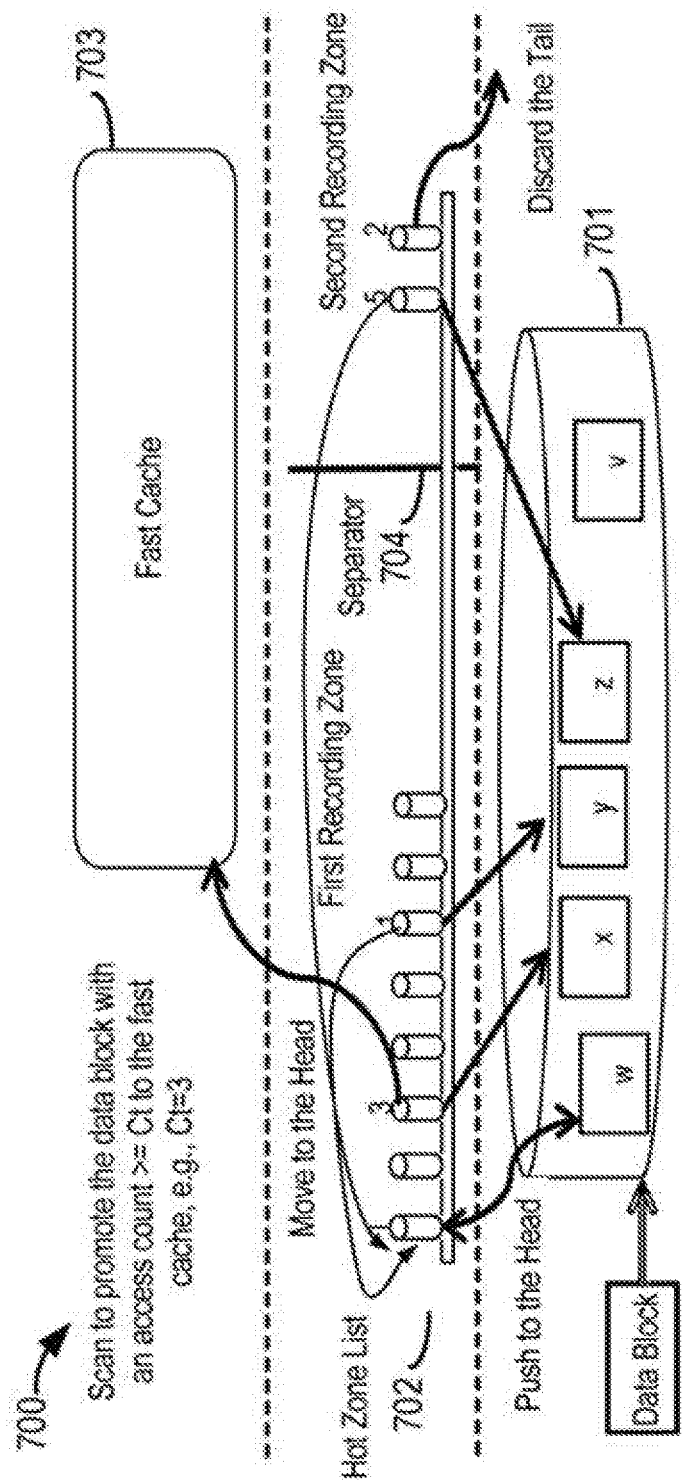
FIG. 7 schematically illustrates a schematic diagram of a data caching solution according to an embodiment of the present disclosure.

Hereinafter, for illustrative purposes, reference will be made FIG. 7 to describe examples of the hot zone list and promotion operation in detail. However, it shall be noted that the present invention is not limited thereto. As shown in FIG. 7, data blocks x, y, z, v, and w are stored in a low-speed storage device 701 such as a hard disk. The hot zone list 702 is for storing the access count information of the data blocks stored in the low-speed storage device 701. In particular, when the data block in the low-speed storage device 701 is accessed, access count information on the data will be recorded in the hot zone list 702. The fast cache 703, for example a FAST Cache, is a cache storage adapted to cache data with a larger probability of being accessed.

The hot zone list 702 for example may be a small patch of area in the fast cache 703. The hot zone list 702 may also be located in any other appropriate storage zone. The access count information recorded in the hot zone list 702 may be stored in any appropriate form. For illustrative purposes, FIG. 8 will be referenced to describe an exemplary data structure for recording access count information according to an embodiment of the present disclosure.

Figure 8:
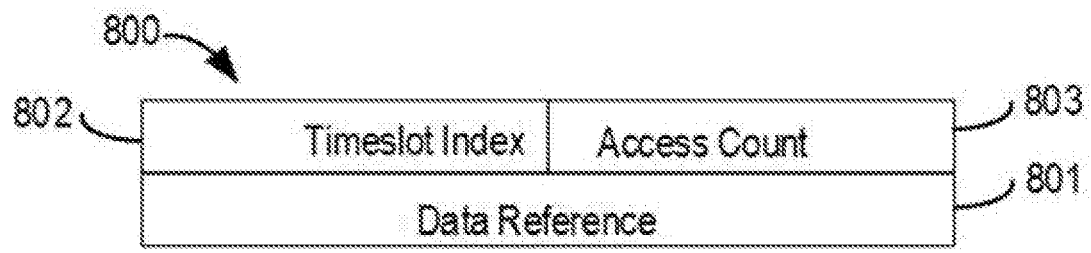
FIG. 8 schematically illustrates a schematic diagram of an exemplary data structure for storing access count information according to an embodiment of the present disclosure.

As illustrated in FIG. 8, the data structure comprises a data reference 801, a timeslot index 802, and an access count 803. The data reference 801 is information on the data per se, for example, a pointer pointed to the actual data blocks w, x, y, z that were already accessed, mainly aiming to indicate that piece of access count information is about which data block. The timeslot index 802 is the recording timeslot corresponding to the current access count. When a data access occurs, whether to increase the access count may be determined based on whether the recording timeslot when the access occurs and the timeslot of the current access count are the same timeslot. The access count 803 is a count recording the times of the data block being accessed. When it is needed to increase the access count information, the value in the access count will be increased, thereby recording the access count information. However, it shall be noted that FIG. 8 is provided only for illustrative purposes, and the present disclosure is not limited thereto. Any data structure that may be used for recording the access count, information is feasible.

Reference is made back to FIG. 7; as illustrated, the hot zone list 702 comprises a first recording zone and a second recording zone. The hot zone list 702 is divided up into the first recording zone and the second recording zone, for example, by a separator 704, wherein the first recording zone may be referred to as, for example, a hot recording zone, while the second recording zone may be referred to as, for example, a cold recording zone. The hot recording zone stores access count information of the data whose accessed time is later than the accessed time of the data stored in the cold recording zone. In other words, the data whose access counts are stored in the hot recording, zone are hotter than the data stored in the cold recording zone. In an embodiment according to the present disclosure, the access count information in the hot zone list is stored according to the accessed time sequence, such that the access count information of the newly accessed or re-accessed data will be stored in the header of the hot recording zone, while the later access count information will be moved backward one by one according to the needs. When the amount of the access count information stored in the hot recording zone exceeds a predetermined amount, for example, already full, the backmost (tail) data in the hot recording zone will be moved to the head of the following cold recording zone, and moved backward step by step with the later data access, unless they are re-accessed. If the number of records in the cold recording zone has reached a predetermined value, for example, already full, adding of a new record in the hot, zone will cause the last (tail) record in the cold recording zone to be removed from the cold recording zone. In other words, the tail of the cold recording zone is discarded or thrown out of the hot zone list.

The priority of increasing the access counts of data reference in the hot recording zone is higher than increasing the access counts of data reference in the cold recording zone. For example, in an embodiment of the present disclosure, when the data, whose access count is stored in the hot recording zone is first accessed within a recording time slot, its access count increases, and the access count information of the data reference will be moved to a head position of the hot recording zone, while following accesses thereto in the recording timeslot will not increase the count, but the data will be moved again to the head position of the hot recording zone; in contrast, when the data whose access count is stored in the cold recording zone is first accessed, it will be moved to the head position of the hot recording zone without increasing its access count: meanwhile, its following access within the recording timeslot will not increase its count, but the data will be moved again to the head position in the hot recording zone.

After expiation of its recording period, promotion scanning may be executed. During the promotion scanning process, according to the access count information stored in the hot zone list 702, the data blocks whose access count is greater than a predetermined threshold Ct (for example, Ct=3) will be transferred into the fast cache 703 from the low-speed storage device 701. The fast cache 703 is a cache storage zone of the system, configured to cache data blocks with a larger probability of being re-accessed, thereby enhancing the performance of data access.

In addition, as mentioned above, promotion may be performed only to the recording information in the hot recording zone. In this way, it can be ensured that real hotter data are promoted in the cache, and a preferred promotion opportunity may be given to the long-term hotter data.

In an embodiment of the present disclosure, the first recording zone and the second recording zone may be further resized based on the I/O load condition and cache state so as to adapt system conditions. Hereinafter, for illustrative purposes, an exemplary method for determining a separator 704 between the first recording zone and the second recording zone will be introduced. However, it should be noted that the present disclosure is not limited thereto.

In an embodiment of the present disclosure, the separator of the hot zone list may be indicated by L, i.e., a separator or boundary between the first recording zone and the second recording zone. L, for example, denotes a percentage value or a decimal value, representing a percentage of the first recording zone over the entire hot zone list. μ denotes a mean value of sizes of data block sample points. Xi denotes the size of a sampled data block sample points, and N denotes the number of all sample points of the data block. The boundary L, for example, may be Obtained through standard deviation of data blocks. For illustrative purposes, equation 3 is provided below, based on which the separator between the first recording zone and the second recording zone may be determined.

$$L = \sqrt{\frac{1}{N}\sum_{i=1}^{N}(X_i - \mu)^2} \qquad \text{(Equation 3)}$$

In addition, in a case of not capturing any sample point, the minimum length of the first recording zone may be set to identical to the initial state, for example, L=0.8 (i.e., 80%).

Figure 9:
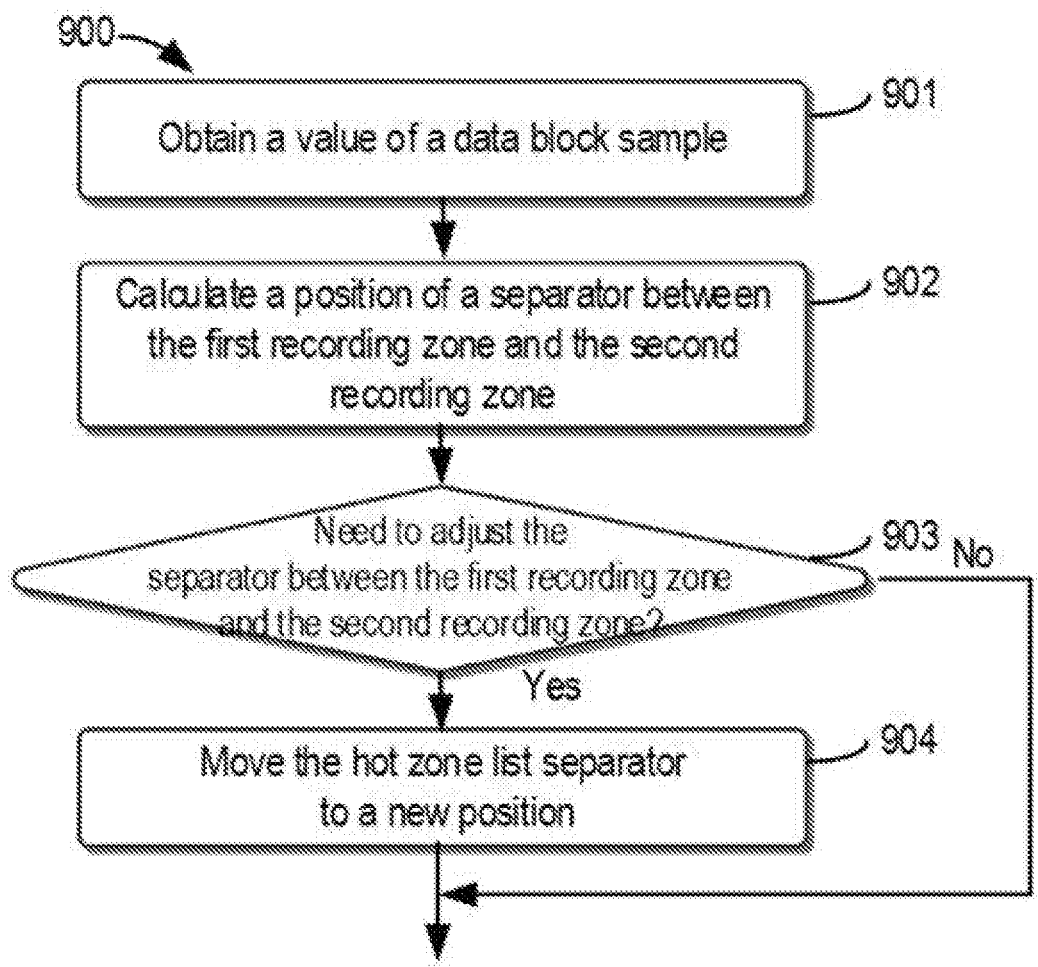
FIG. 9 schematically illustrates a flow diagram of a separator for adjusting a hot zone list according to an embodiment of the present disclosure.

FIG. 9 schematically illustrates a flow diagram of a separator for adjusting a hot zone list according to an embodiment of the present disclosure. As illustrated in FIG. 9, first, a sample value of a data block is obtained in step 901; then, a separator position of the hot zone list, i.e., a separator between the first and second recording zones, is determined for example according to equation 2. Then, in step 903, it is determined whether adjustment of the separator needs to be performed, based on the real separator position and the just determined separator position between the first recording zone and the second recording zone. For example, if the difference between the calculated separator position and the real separator position is within a predetermined threshold range, adjustment is not performed; on the contrary, if the difference exceeds a predetermined threshold, adjustment is performed in step 904 to move the separator between the first recording zone and the second recording zone to a new separator position. It shall be noted that the manner of adjusting the separator between the first recording zone and the second recording zone is only provided for illustrative purposes, and the present disclosure is not limited thereto. Instead, adjustment of the separator between the first recording zone and the second recording zone may be performed in any appropriate manner.

Figure 10:
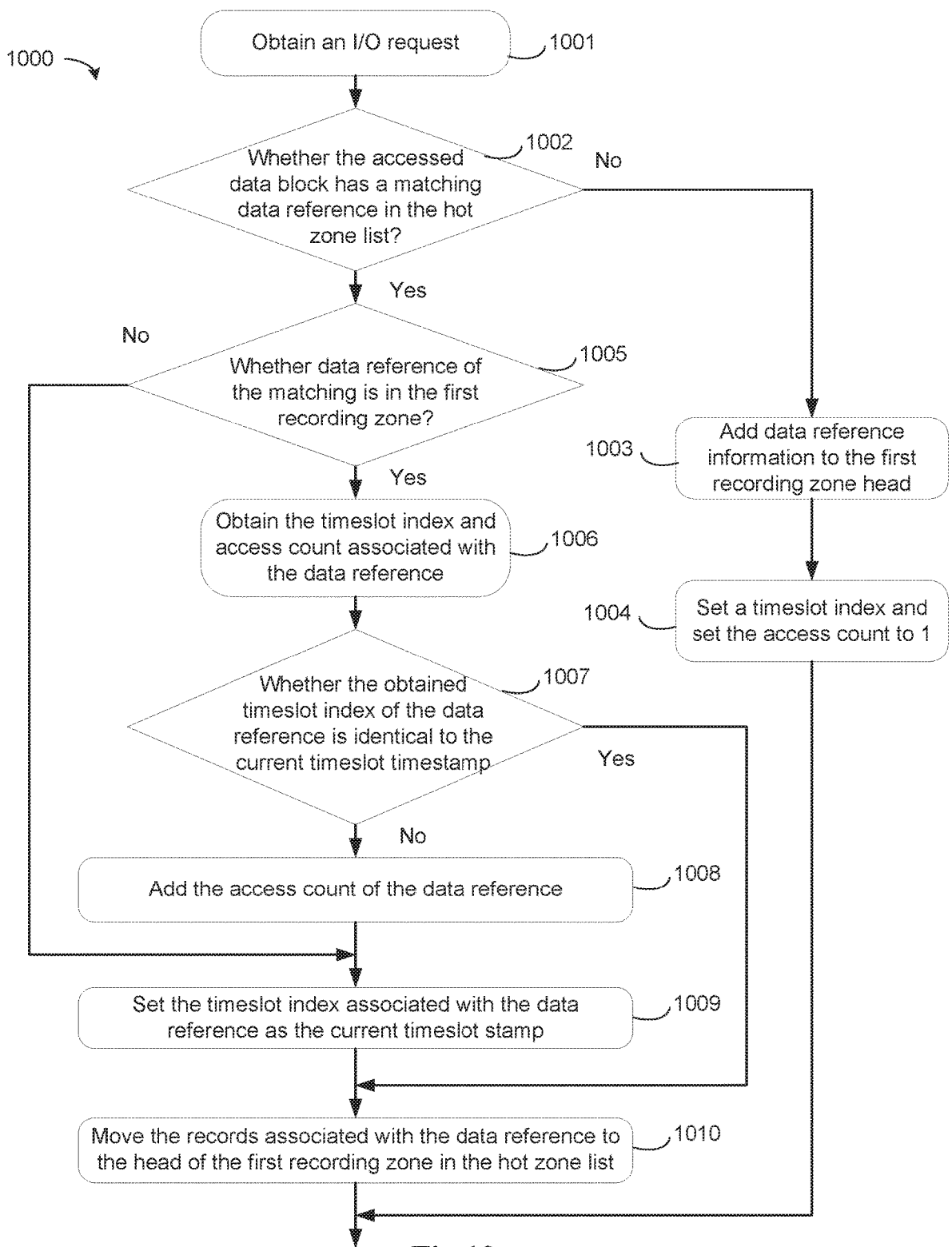
FIG. 10 schematically illustrates a flow diagram of a method for performing access counting according to an embodiment of the present disclosure.

In addition, in order to make those skilled in the art understand the present invention more thoroughly, a flow diagram of an exemplary method for recording access counts according to an embodiment of the present disclosure is further presented in FIG. 10 for illustrative purposes. However, it shall be noted that these flows and steps are only exemplary, and the present disclosure is not limited thereto. Any appropriate flow may be adopted to record the access counts.

As shown in FIG. 10, first in step 1001, a data access request (i.e., an I/O request) may be obtained. The I/O request, for example, may be obtained through an I/O access adapter provided by the system. Next, in step 1002, it is determined whether the accessed data block has a matching data reference in the hot zone list, thereby determining whether access count information corresponding to the accessed data already exists in the hot zone list. If the hot zone list stores data reference matching the accessed data, it indicates that the hot zone list has access count information matched with the accessed data; in the case of non-existence, it indicates that the hot zone list does not have access count information matching the accessed data.

If the hot zone list does not have a matching data reference, it is needed to newly add access record information on the accessed data. To this end, in step 1003, new access count information is added at the header of the first recording zone of the hot zone list. For example, the structure shown in FIG. 8 may be employed, where the data reference information of the accessed data block may be written in the "data reference 801" in the structure. Subsequently in step 1004, the timeslot index and the access count are set in the "timeslot index 802" and "access count 803" in the structure respectively. In this case, the timeslot index is set as a timeslot index corresponding to the current recording timeslot; while for the access count, because data is first accessed, its access count is set to 1. On the other hand, if the hot zone list has a matching data reference, it indicates that the data is not accessed for the first time. At this point, it may be further determined in step 1005 in which recording zone of the hot zone list the matching data reference is stored, i.e., whether it is stored in the first recording zone or in the second recording zone.

If it is determined in step 1005 that the determined matching data reference is stored in the second recording zone for depositing records associated with data references with an earlier access time, the method 1000 directly proceeds to step 1009 in which the timeslot index is updated, i.e., the timeslot index associated with data reference is set to the timeslot index corresponding to a timestamp of the current timeslot, and in step 1010 the records associated with the data reference are moved to the header of the first recording zone in the hot zone list without increasing the access count value.

On the contrary, if it is determined in step 1005 that the matching data reference is stored in the first recording zone, it is needed to obtain the timeslot index and access count associated with the matching data reference in step 1006 and to further determine whether the obtained timeslot index is identical to the timestamp of the current count timeslot in step 1007, or in other words, whether the recording timeslot corresponding to the obtained timeslot index and the current recording timeslot are the same recording timeslot.

If it is determined in step 1007 that the obtained timeslot index is different from the timestamp of the current count timeslot, it means this access occurs in a new recording timeslot, and thus the access count of the data reference is increased in step 1008. Then, the method proceeds to step 1009 to update the timeslot index, i.e., setting the timeslot index of relevant data reference to the timeslot index corresponding to the timestamp of the current recording timeslot, and in step 1010, the records associated with the data reference are moved to the header of the first recording zone in the hot zone list. On the contrary, if it is determined in step 1007 that the obtained timeslot index is identical to the timestamp of the current count timeslot, it means this access and the last access occur in the same recording timeslot; therefore, the method 1000 proceeds to step 1010 to directly move the records associated with the data reference to the header of the first recording zone in the hot zone list without increasing the corresponding access count value.

An exemplary method for recording access counts of data according to an embodiment of the present disclosure was described with reference to FIG. 10. However, it shall be noted that the flow chart illustrated in FIG. 10 is only exemplary, and the present disclosure is not limited thereto. For example, when recording the accessed data, the operations of increasing the access count, updating the timeslot index, and moving the records to a header of the first recording zone may be performed in any manner, as long as it finally makes sure that the records moved to the header of the first recording zone are updated as required.

It may be seen from the depictions above that in an embodiment of the present disclosure, there is provided an improved solution for caching data. According to the solution, access count information on respective data is recorded within respective recording timeslots however, in a single recording timeslot, the records of the access count information do not always increase with increase of the accessed times of the data; instead, the recording is restricted: meanwhile, access count information within different recording timeslots will be aggregated; after expiration of the recording period, data to be promoted into the caching storage area are determined based on the access count information aggregated within the recording period. Therefore, with the embodiments of the present disclosure, hotter data within a relatively long term can get a better opportunity to be promoted into the cache storage area, and meanwhile the possibility of promoting noise data that is relatively hot within a short term can be significantly reduced, thereby achieving a more effective data caching and more sufficiently exploiting of cache resources.

Figure 11:
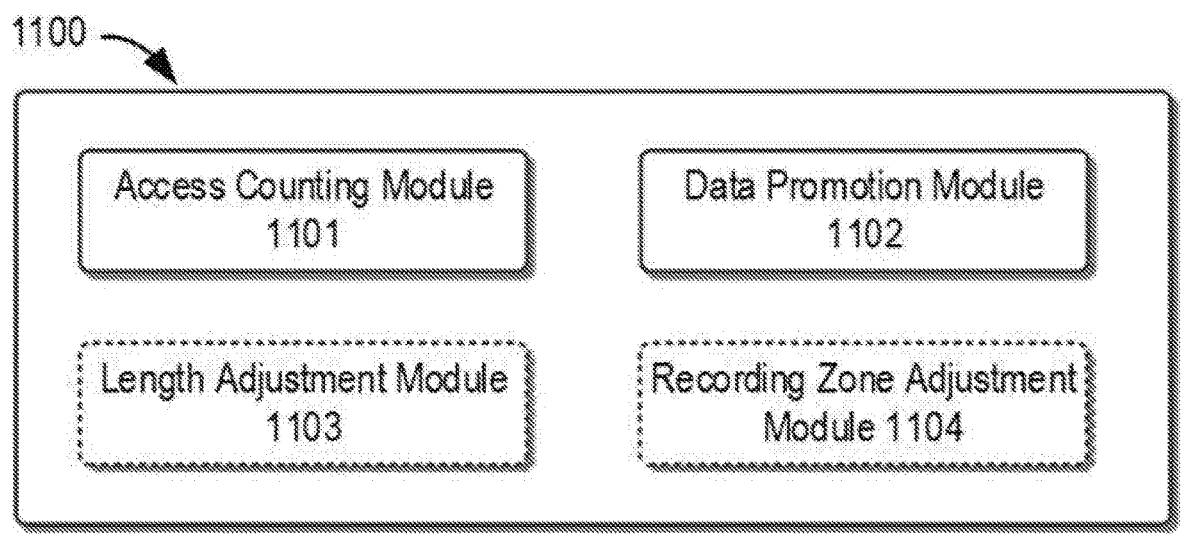
FIG. 11 schematically illustrates a block diagram of an apparatus for caching data according to an embodiment of the present disclosure.

FIG. 11 schematically illustrates a block diagram of an apparatus for caching data according to an embodiment of the present disclosure. As shown in FIG. 11, the apparatus 1100 for caching data may comprise an access counting module 1101 and a data promotion module 1102. The access counting module 1101 is configured to record, within a recording period for recording access count information of data, access count information on respective data. Herein, the recording period includes a plurality of recording timeslots, where within a single recording timeslot, recording of the access count information is restricted, while the access count information within a plurality of recording timeslots is aggregated. The data promotion module 1102 is configured to promote, in response to expiration of the recording period, the respective data into the cache storage area based on the access count information.

In an embodiment according to the present disclosure, the access counting module 1101 may be further configured to record, within a single recording timeslot of the recording period, multiple accesses to the same data as one access.

In another embodiment of the present disclosure, the apparatus 1100 may also comprise a length adjustment module 1103 configured to adjust at least one of lengths of the recording timeslot and the recording period based on an input/output I/O load condition, a caching condition, and a promotion frequency.

In a further embodiment of the present disclosure, the access counting module 1101 may be further configured to store the access count information in a hot zone list, the hot zone list including a first recording zone and a second recording zone. The time when the data associated with the access count information stored in the first recording zone is later than the time when the data associated with the access count information stored in the second recording zone is accessed. The data promotion module 1102 may be configured to promote data associated with the access count information recorded in the first recording zone.

In a further embodiment of the present disclosure, the access counting module 1101 may also be configured to perform any one of the following: when the access count information stored in the first recording zone exceeds a predetermined amount, transferring the access count information of the data that was accessed relatively earlier to the second recording zone. Additionally or alternatively, the access counting module 1101 may also be configured to: when the access count information stored in the second recording zone exceeds a predetermined amount, remove the access count information of the data that was accessed earlier from the second recording zone.

In another embodiment of the present disclosure, the access counting module 1101 is also configured to: when the data with access count information recorded in the second recording zone is accessed, transfer the access count information on the data from the second recording zone to the first recording zone. Optionally, the access count information on the data may be maintained unchanged.

In another embodiment of the present disclosure, the apparatus 1100 may also comprise a recording zone adjustment module 1104. The recording zone adjustment module 1104 may be configured to adjust sizes of the first recording zone and the second recording zone based on the I/O load condition and the cache state.

Figure 12:
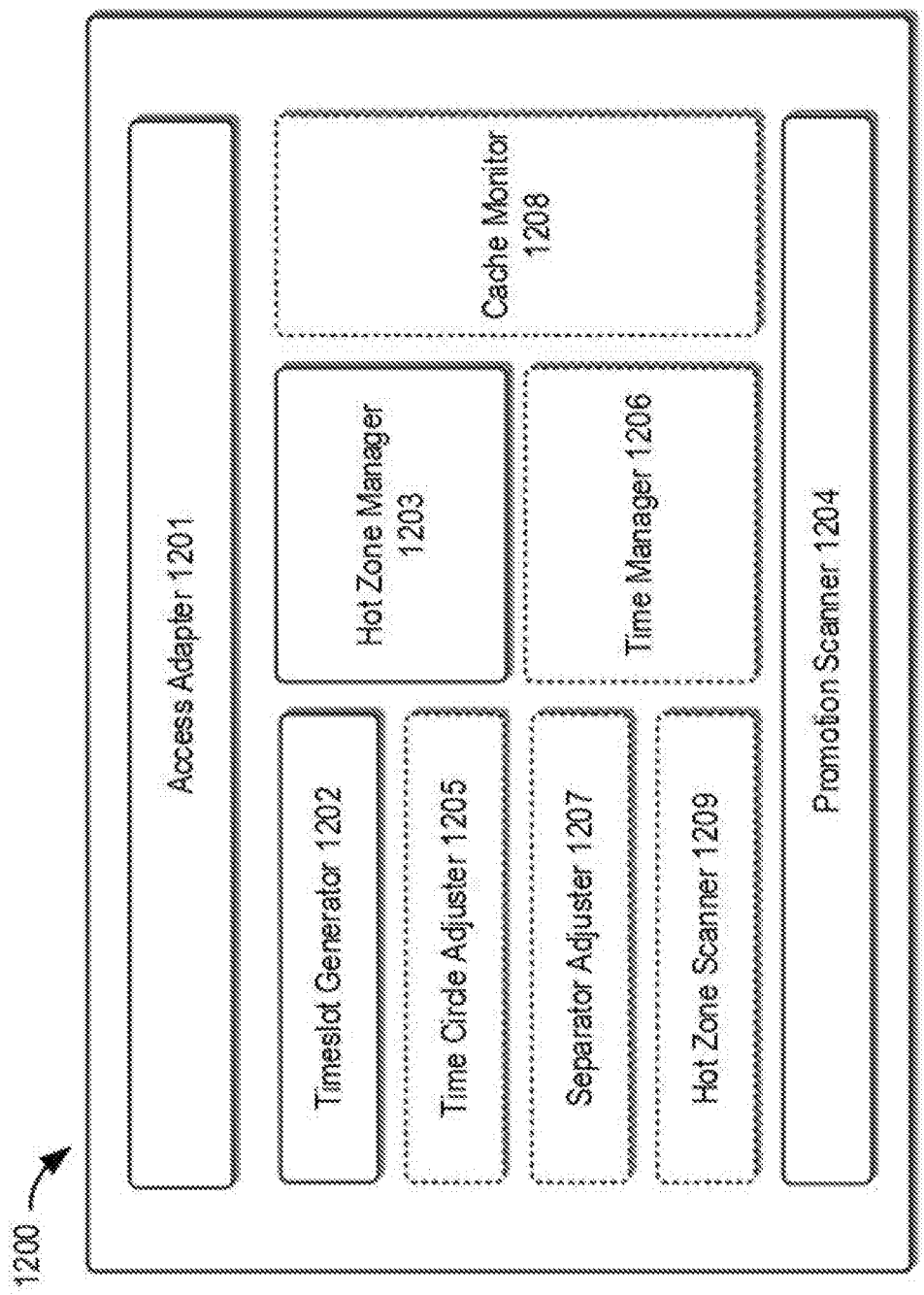
FIG. 12 schematically illustrates a schematic diagram of architecture of a system of caching data according to an embodiment of the present disclosure.

Additionally, FIG. 12 schematically illustrates a diagram of architecture of a system of caching data according to an embodiment of the present disclosure. As shown in FIG. 12, the system 1200 may comprise: an access adapter 1201, a timeslot generator 1202, a hot zone manager 1203 and a promotion scanner 1204.

The access adapter 1201 may also be configured to provide an interface for data access to the outside. In other words, the external application may access the data through an API provided via the access adapter. Therefore, the access adapter may obtain an I/O data access from the external, and notify the corresponding module (for example, the hot zone manager 1203) to perform subsequent operations.

The timeslot generator 1202 may be configured to generate a recording timeslot within a recording period for recording the access count information of the data, and provide a corresponding recording timeslot identifier, wherein the recording period comprises a plurality of recording timeslots. In an embodiment of adopting a time circle, when the timeslot index reaches a tail timeslot number, i.e., upon expiration of the recording period, the timeslot generator may generate a timeslot index from the beginning.

The hot zone manager 1203 may be configured to manage a hot zone list for storing the access record information of the data, and record the access recording information on respective data and the corresponding recording timeslot using the recording timeslot identifier generated by the timeslot generator according to data access via the access adapter. In particular, recording of the access count information within a single recording timeslot is restricted, while the access count information within a plurality of recording timeslots will be aggregated. Optionally, the hot zone manager 1203 is configured to record multiple accesses for the same data as one access within a single recording timeslot of the recording period. Also optionally, the hot zone list may comprise a first recording zone and a second recording zone. The time when the data associated with the access count information stored in the first recording zone is accessed is later than the time when the data associated with the access count information stored in the second recording zone is accessed.

In an embodiment of the present disclosure, the hot zone manager 1203 may also be configured to: when the access count information stored in the first recording zone exceeds a certain amount, transfer the access count information of the data that was accessed relatively earlier to the second recording zone. Additionally or alternatively, the hot zone manager 1203 may also be configured to: when the access count information stored in the second recording zone exceeds a predetermined amount, remove the access count information of the data that was accessed relatively earlier from the second recording zone.

In an embodiment of the present disclosure, the hot zone manager 1203 may also be configured to: when the data whose access count information is recorded in the second recording zone is accessed, transfer the access count information on the data from the second recording zone to the first recording zone. Optionally, the access count information on the data may be maintained unchanged.

The promotion scanner 1204 may be configured to scan the hot zone list, and promote, in response to expiration of the recording period, respective data into the caching storage area based on the access count information. In particular, in an embodiment in which the hot zone list includes the first recording zone and the second recording zone, the promoting scanner 1204 may be configured to promote the data associated with the access count information recorded in the first recording zone.

In an embodiment of the present disclosure, the system 1200 may further comprise a time circle adjustor 1205 and a time manager 1206. The time circle adjuster 1205 may be configured to adjust at least one of lengths of the recording timeslot and the recording period. The time manager 1206 may be configured to manage the timeslot generator 1202 to generate respective timeslots, and control the time circle adjuster 1205 to adjust at least one of lengths of the recording timeslot and the recording period based on the input/output I/O load condition, the caching condition, and the promotion frequency.

In an embodiment of the present disclosure, the system 1200 may also comprise a separator adjuster 1207. The separator adjuster 1207 may be configured to adjust sizes of the first recording zone and the second recording zone. The hot zone manager 1203 is further configured to control the separator adjuster 1207 to adjust the sizes of the first recording zone and the second recording zone based on the I/O load condition and the cache state.

In an embodiment of the present disclosure, the system 1200 may also comprise a cache monitor 1208 configured to monitor at least one of the caching condition and the promotion frequency, and provide the monitoring result to the hot zone manager 1203 or the time manager 1206. Alternatively or additionally, the system 1200 may further comprise a hot zone scanner 1209 configured to scan the hot zone list to monitor the input/out I/O load condition, and provide the monitoring result to the hot zone manager 1203 or the time manager 1206. In this way, the monitoring result information may be provided to the hot zone manager 1203 or the time manager 1206, thereby supporting the hot zone manager 1203 to control the separator adjuster 1207 to adjust the sizes of the first recording zone and the second recording zone based on the I/O load condition and the cache state, or supporting the time manager 1206 to control the time circle adjuster 1205 to adjust at least one of lengths of the timeslot and the recording period based on the input/output I/O load state, cache state, and promotion frequency.

It shall be noted that for purposes of simplification, operations of respective components of the apparatus 1100 and the system 1200 have been described briefly. For more details about the operations of these components, one may refer to relevant portions in the detailed depictions of the method in FIGS. 1 to 10.

Additionally, it also needs to be noted that the data caching solution of the present disclosure may also be implemented through a computer program product. The computer program has program codes embodied thereon, which, when being executed on the processor, cause the processor to perform the method of caching data according to the present disclosure.

It shall be noted that the embodiments of the present disclosure may be implemented in software and/or a combination of software and hardware. For example, they may be implemented by an application-specific, integrated circuit (ASIC), a general-purpose computer or any other similar hardware device. In one embodiment, the software program, of the present disclosure may also be executed by the processor to implement the steps or functions of the above. Likewise, the software program (including relevant data structure) of the present disclosure may be stored in a computer-readable recording medium, for example, a RAM memory, a magnetic or optical driver or a soft disk or similar devices. Additionally, some steps or functions of the present disclosure may be implemented by hardware, for example, a circuit cooperating with the processor to execute respective steps or functions.

In addition, a part of the present disclosure may be applied as a computer program product, for example, a computer program instruction, which, when being executed by the computer, may invoke or provide the method and/or solution according to the present disclosure. The program instruction invoking the method of the present disclosure may be stored in an immobile or mobile recording medium, and/or transmitted through broadcast or other signal carrying media, and/or stored, in a working memory of the computer device running according to the program instruction. Here, in an embodiment according to the present disclosure, there is an apparatus comprising a memory storing computer program instructions and a processor for executing program instructions, wherein when the computer program instructions are executed by the processor, the apparatus is triggered to execute the method and/or solution based on a plurality of embodiments of the present disclosure.

To those skilled in the art, it is apparent that the present disclosure is not limited to the above illustrative embodiments, and the present disclosure can be implemented in any other specific form without departing from the spirit or basic features of the present disclosure. Therefore, from any perspective, the embodiments should be regarded as illustrative, not limitative, and the scope of the present disclosure is limited by the appended claims, not by the depictions above; therefore, any changes intended to fall within the meaning and scope of equivalent elements of the claim should be included within the present disclosure. No reference signs in the claims should be regarded as limiting the involved claims. Besides, it is apparent that the word "comprise(s)" does not exclude other units or steps, and the singularity does not exclude plurality. A plurality of units or modules stated in the apparatus claim may also be implemented by one unit or module through software or hardware. Words such as "first" and "second" are used to indicate names, without indicating any specific sequence.

Additionally, it may also be understood that based on the disclosure and teaching here, those skilled in the art may envisage various modifications, variations, substitutions or equivalents without departing from the spirit and scope of the present disclosure. These modifications, variations, substitutions or equivalents are all included within the scope of the present disclosure limited by the claims.

We claim:

1. A method for caching data, comprising:
    recording, within a recording period for recording access count information of the data, access count information on respective data, wherein the recording period includes a plurality of recording timeslots, the recording of the access count information within a single recording timeslot of the plurality of recording timeslots being restricted, while the access count information within the plurality of recording timeslots is aggregated;
    promoting, in response to expiration of the recording period, the respective data into a cache area based on the access count information; and
    adjusting at least one of a length of the single recording timeslot and the recording period based on at least one of a condition of an input/output (I/O) load, caching condition, and promotion frequency, including:
        determining that the I/O load is heavy, including decreasing utilization of a cache and the promotion frequency to effectuate extending the recording period and the length of the single recording timeslot.

2. The method according to claim 1, wherein the recording access count information on respective data comprises:
    recording, within a single recording timeslot of the recording period, multiple accesses for the same data as one access.

3. The method according to claim 1, wherein the access count information is stored in a hot zone list, the hot zone list including a first recognizing zone and a second recording zone, the time when the data associated with the access count information stored in the first recording zone was accessed is later than the time when the data associated with the access count information stored in the second recording zone was accessed, wherein the promoting into the caching zone is performed for the data associated with the access count information recorded in the first recording zone.

4. The method according to claim 3, further comprising:
    when the access count information stored in the first recording zone exceeds a predetermined amount, transferring the access count information of the data with an earliest accessed time to the second recording zone.

5. The method according to claim 3, further comprising:
    when the access count information stored in the second recording zone exceeds a predetermined amount, removing the access count information of the data with an earliest accessed time from the second recording zone.

6. The method according to claim 3, further comprising:
    when data with access count information recorded in the second recording zone is accessed, transferring the access count information of the data from the second recording zone to the first recording zone.

7. The method according to claim 6, wherein the access count information of the data which are transferred into the first recording zone is maintained unchanged.

8. The method according to claim 3, further comprising: adjusting sizes of the first recording zone and the second recording zone based on I/O load condition and caching condition.

9. An apparatus for caching data, comprising:
an access counting module configured to record, within a recording period for recording access count information of the data, access count information on respective data, wherein the recording period includes a plurality of recording timeslots, the recording of the access count information within a single recording timeslot of the plurality of recording timeslots being restricted, while the access count information within the plurality of recording timeslots is aggregated;
a data promotion module configured to promote, in response to expiration of the recording period, the respective data into a cache area based on the access count information; and
a length adjusting module configured to adjust at least one of a length of the single recording timeslot and the recording period based on at least one of a condition of an input/output (I/O) load, caching condition, and promotion frequency, including:
determining that the I/O load is heavy, including decreasing utilization of a cache and the promotion frequency to effectuate extending the recording period and the length of the single recording timeslot.

10. The apparatus according to claim 9, wherein the access counting module is further configured to:
record, within a single recording timeslot of the recording period, multiple accesses for the same data as one access.

11. The apparatus according to claim 9, wherein the access counting module is further configured to store the access count information in a hot zone list, the hot zone list including a first recording zone and a second recording zone, wherein a time when the data associated with the access count information in the first recording zone was accessed is later than a time when the data associated with the access count information in the second recording zone was accessed, wherein the data promotion module is configured to perform promotion for the data associated with the access count information recorded in the first recording zone.

12. The apparatus according to claim 11, wherein the access counting module is further configured to execute any one of:
when the access count information stored in the first recording zone exceeds a predetermined amount, transferring the access count information of the data with an earliest accessed time to the second recording zone; and
when the access count information stored in the second recording zone exceeds a predetermined amount, removing the access count information of the data with an earliest accessed time from the second recording zone.

13. The apparatus according to claim 11, wherein the access counting module is further configured to:
when data with access count information recorded in the second recording zone is accessed, transfer the access count information of the data from the second recording zone to the fast recording zone, and maintain the access count information on the data unchanged.

14. The apparatus according to claim 11, further comprising a recording zone adjustment module configured to:
adjust sizes of the first recording zone and the second recording zone based on I/O load condition and caching condition.

15. A system for caching data, comprising:
an access adapter configured to provide an interface for outside data access;
a timeslot generator configured to generate, within a recording period for recording access count information of data, a recording timeslot, and provide a corresponding recording timeslot identifier, wherein the recording period includes a plurality of recording timeslots;
a hot zone manager configured to manage a hot zone list for storing access record information of data, and to record access record information on respective data based on data access via the access adapter using the recording timeslot identifier produced by the timeslot generator, wherein the recording of the access count information within a single recording timeslot of the plurality of recording timeslots being restricted, while access count information within the plurality of recording timeslots will be aggregated;
a promotion scanner configured to scan the hot zone list, and promote, in response to expiration of the recording period, the respective data into the cache area based on the access count information; and
a timer manager configured to control the time circle adjuster to adjust at least one of a length of the single recording timeslot and the recording period based on at least one of a condition of an input/output (I/O) load, caching condition, and promotion frequency, including:
determining that the I/O load is heavy, including decreasing utilization of a cache and the promotion frequency to effectuate extending the recording period and the length of the recording timeslot.

16. The system according to claim 15, wherein the hot zone manager is configured to record, within a single recording timeslot of the recording period, multiple accesses for the same data as one access.

17. The system according to claim 15,
wherein the timer manager is further configured to manage the timeslot generator to generate respective timeslots.

18. The system according to claim 15, wherein the hot zone list includes a first recording zone and a second recording zone, the time when the data associated with the access count information in the first recording zone was accessed is later than the time when the data associated with the access count information in the second recording zone was accessed, wherein the data promotion module is configured to perform promotion for the data associated with the access count information recorded in the first recording zone.

19. The method according to claim 1, further comprising determining that the I/O load is light, including increasing utilization of the cache and the promotion frequency to effectuate shortening the recording period and the length of the recording timeslot.

20. The apparatus according to claim 9, further comprising determining that the I/O load is light, including increasing utilization of the cache and the promotion frequency to effectuate shortening the recording period and the length of the recording timeslot.

* * * * *